A. ORTENGREN.
VEHICLE WHEEL.
APPLICATION FILED JUNE 22, 1912.

1,108,219.

Patented Aug. 25, 1914.
2 SHEETS—SHEET 1.

WITNESSES:

INVENTOR
Alfred Ortengren
BY
E. W. Marshall
ATTORNEY

A. ORTENGREN.
VEHICLE WHEEL.
APPLICATION FILED JUNE 22, 1912.

1,108,219.

Patented Aug. 25, 1914.
2 SHEETS—SHEET 2.

WITNESSES:
F. Graves
G. Quimby

INVENTOR
Alfred Ortengren
BY
E. W. Marshall
ATTORNEY

UNITED STATES PATENT OFFICE.

ALFRED ORTENGREN, OF BROOKLYN, NEW YORK.

VEHICLE-WHEEL.

1,108,219.  Specification of Letters Patent.  Patented Aug. 25, 1914.

Application filed June 22, 1912. Serial No. 705,228.

*To all whom it may concern:*

Be it known that I, ALFRED ORTENGREN, a citizen of the United States, and a resident of Brooklyn, county of Kings, and State of New York, have invented certain new and useful Improvements in Vehicle-Wheels, of which the following is a specification, reference being had to the accompanying drawings, forming a part thereof.

This invention relates to vehicle wheels, and more particularly to wheels employed as driving wheels on motor vehicles.

The object of the invention is to provide a driving wheel of simple construction but of great strength which is efficient in running and is also capable of use as a steering wheel.

In order that the invention may be fully understood, I will now proceed to describe an embodiment thereof, having reference to the accompanying drawings illustrating the same, and will then point out the novel features thereof in appended claims.

Figure 1:
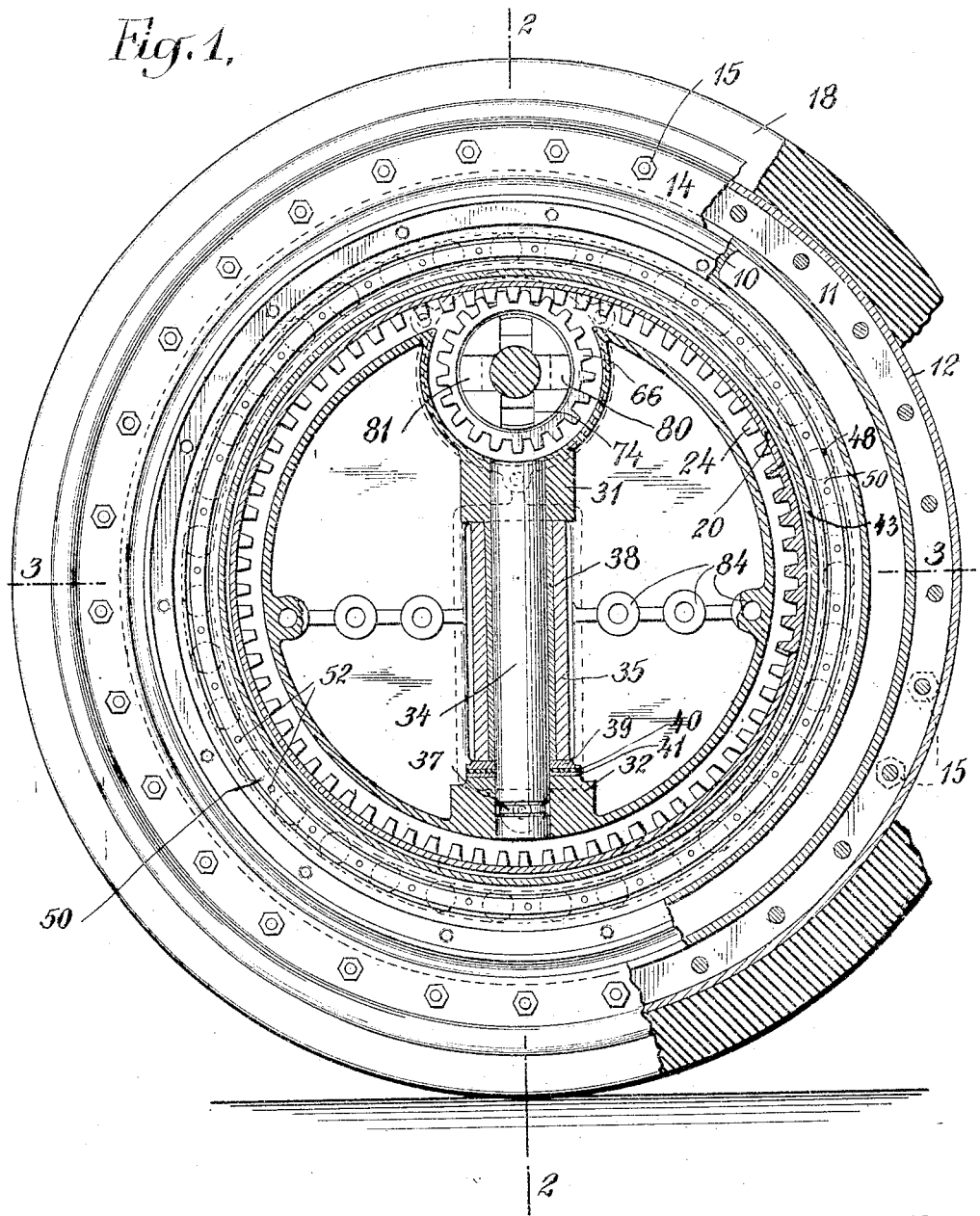
Figure 2:
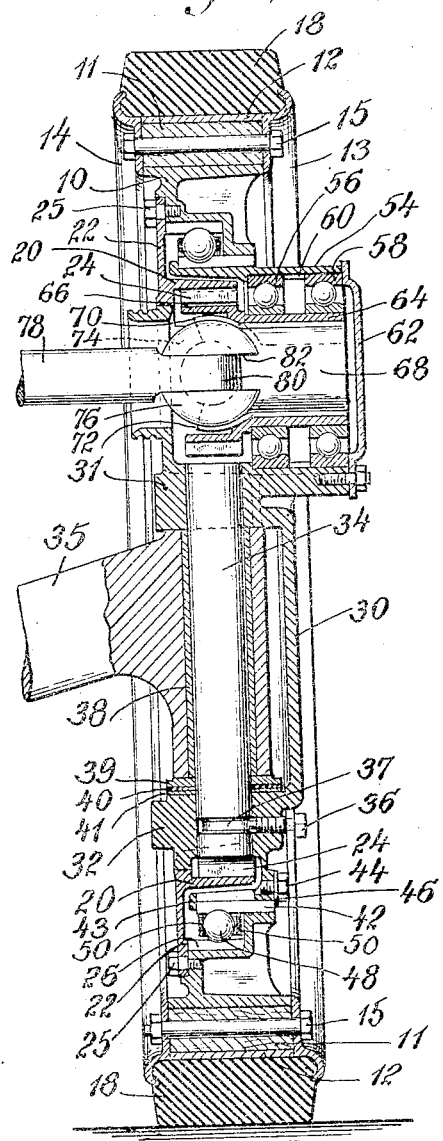
Figure 3:
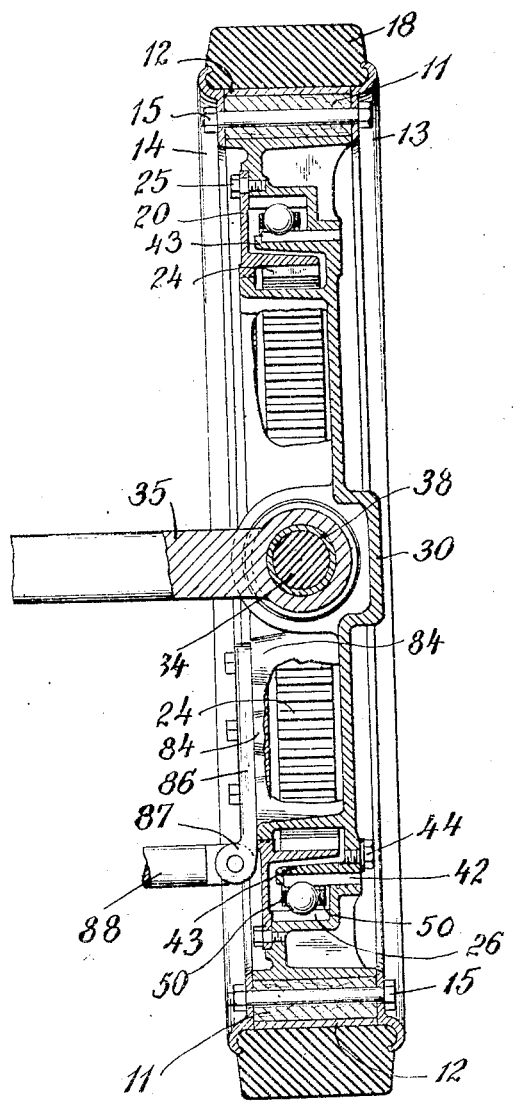

In the drawings, Figure 1 is a side elevation, partly in section, of a wheel constructed in accordance with my invention. Fig. 2 is a transverse vertical section taken on the line 2—2 in Fig. 1. Fig. 3 is a horizontal section taken on the line 3—3 in Fig. 1.

As illustrated in the drawings, the wheel comprises an annular member 10 of irregular cross-section, which constitutes a supporting member for the rim of the wheel.

11 is an annular spacing member of wood on the outside of which is a steel band 12. A pair of flanges 13 and 14 are clamped against the edges of the members 10 and 11 and the band 12 by bolts 15 which pass through the wooden member. The outer portions of the flanges 13, 14 are curved and arranged to engage the sides of a tire 18 of rubber or other suitable material to hold the latter in place on the rim of the wheel. 20 is another annular member, a part of which forms a flange 22 which is secured to member 10 by bolts, and another part of which forms, an integral spur gear 24. This gear and its flange are secured to the supporting member 10 by bolts 25. An outer ball race 26 is fitted within a part of the member 10 and is held in place by the flange 22. The parts so far described constitute what may be termed the rotary portion of the wheel.

The stationary portion of the wheel comprises a central member 30 which is provided with a pair of bosses 31, 32 in which is supported a vertical stud 34. This stud is held in place by a set screw 36 which enters a peripheral groove or channel 37 on the stud.

35 is the end of a shaft or axle. This is provided with a sleeve or bushing 38 which surrounds the stud 34, the axis of said stud being in the vertical transverse median plane of the wheel. A series of washers 39, 40, 41 surround the stud 34 and are located between the lower end of the steering knuckle and the opposing upper flat face of the boss 32. These washers constitute a thrust bearing for the knuckle.

An inner ball race 42 is mounted on the rim 43 of the member 30, and is held in place by screws or bolts 44 threaded into the rim 43 and provided with washers 46 which project beyond the periphery of the rim and overlie the inner face of the ball race. A series of anti-friction balls 48 are adapted to roll in the races 26 and 42. These balls are confined in a retainer which is composed of a pair of flat rings 50 which are spaced apart and held by a plurality of rivets 52. This construction forms a plurality of pockets for the balls which keep them spaced apart a desired distance.

The upper portion of the member 30 is constructed to form a hollow boss 54 within which a pair of ball bearings 56 and 58 are mounted and separated by a ring 60. These ball bearings are held in place by a cap 62 secured to the end of the boss. Secured to rotate with the inner ball races of the bearings 56 and 58 is a sleeve 64 having a pinion 66 formed at one end thereof, which meshes with the internal gear 22. Mounted within the sleeve 64 and keyed thereto is a forked member 68 having prongs 70, 72 which are adapted to fit an annular groove 74 formed in a sphere 76. A shaft 78 driven by some suitable power is also forked at its end and provided with prongs 80, 81 which fit an annular groove 82 in the sphere 76, which groove is in a plane at right angles to that of the groove 74. Thus the grooved sphere with the two forked end pieces which engage with it form a universal joint.

The member 30 is provided with a plurality of bosses 84 in alinement with one another located on opposite sides of the steering knuckle stud 34. A bracket 86 is bolted to one or the other set of these bosses and is provided with an ear 87 to which a reach rod 88 may be connected, the latter being a portion of the steering apparatus. The two sets of bosses 84 are provided so that the wheel may be mounted on either the right or left hand side of the axle.

What I claim is:

1. A wheel comprising a rotary outer member, an inner member supported thereby having provision for pivotal connection with a fixed axle and having gearing adapted to be connected to a driving shaft, a pair of similar sets of bosses on the inner member, and a bracket adapted to be secured to the one or the other of said sets of bosses whereby the wheel is adapted for use on either side of the vehicle, said bracket constituting a portion of the steering apparatus of the vehicle with which the wheel is used.

2. A wheel comprising a rotary outer member, an inner member having provision for pivotal connection with a fixed axle, bearings between the outer and inner members, a gear mounted to rotate with the outer member, a pinion rotatably mounted in said inner member and meshing with the gear, a driving shaft connected to the pinion by a universal joint connection, a pair of similar sets of bosses on the inner member, and a bracket adapted to be secured to the one or the other of said sets of bosses whereby the wheel is adapted for use on either side of the vehicle, said bracket constituting a portion of the steering apparatus of the vehicle with which the wheel is used.

In witness whereof, I have hereunto set my hand this 29th day of March in the year 1912.

ALFRED ORTENGREN.

Witnesses:
WALTER B. WILSON,
W. CHRISTIE.